United States Patent
Ngai et al.

(10) Patent No.: US 6,182,241 B1
(45) Date of Patent: Jan. 30, 2001

(54) METHOD AND APPARATUS FOR IMPROVED TRANSACTION RECOVERY

(75) Inventors: Gary C. Ngai, Saratoga; Hasan Rizvi, Fremont; Leng Leng Tan, Sunnyvale, all of CA (US)

(73) Assignee: Oracle Corporation, Redwood Shores, CA (US)

(*) Notice: Under 35 U.S.C. 154(b), the term of this patent shall be extended for 0 days.

(21) Appl. No.: 09/141,765

(22) Filed: Aug. 27, 1998

Related U.S. Application Data

(63) Continuation of application No. 08/618,443, filed on Mar. 19, 1996, now Pat. No. 5,850,507.

(51) Int. Cl.[7] .......................... H02H 3/05; H03K 19/003
(52) U.S. Cl. ............................... 714/16; 714/15; 707/202
(58) Field of Search .................... 714/16, 15, 19, 714/2, 20, 18; 707/202

(56) References Cited

U.S. PATENT DOCUMENTS

| | | | |
|---|---|---|---|
| 5,065,311 | 11/1991 | Masai et al. | 395/182.18 |
| 5,155,678 | 10/1992 | Fukumoto et al. | 395/425 |
| 5,201,044 | 4/1993 | Frey, Jr. et al. | 395/800 |
| 5,280,611 | 1/1994 | Mohan et al. | 395/182.18 |
| 5,333,303 | 7/1994 | Mohan | 395/182.18 |
| 5,335,343 * | 8/1994 | Lampson et al. | 395/575 |
| 5,440,727 | 8/1995 | Bhide et al. | 395/444 |
| 5,481,699 | 1/1996 | Saether | 395/182.18 |
| 5,485,608 | 1/1996 | Lomet et al. | . |
| 5,524,205 | 6/1996 | Lomet et al. | 395/182.14 |
| 5,524,239 | 6/1996 | Fortier | 395/600 |
| 5,524,241 | 6/1996 | Ghoneimy et al. | 395/182.18 |
| 5,551,046 | 8/1996 | Mohan et al. | 395/800 |
| 5,561,795 | 10/1996 | Sarkar | 395/600 |
| 5,630,047 | 5/1997 | Wang | 395/182.13 |
| 5,734,817 | 3/1998 | Roffe et al. | 395/182.13 |
| 5,850,507 * | 12/1998 | Ngai et al. | 395/182.14 |
| 5,933,838 | 8/1999 | Lomet | . |
| 6,067,550 | 5/2000 | Lomet | . |

OTHER PUBLICATIONS

IBM Technical Disclosure Bulletin, "Shared Data Availability Across A System Failure" vol. 28, No. 3, pp 950–951, Aug. 1985.*

Microsoft Press, "*Microsoft Press Computer Dictionary, Third Edition*", pp. 408.

Oxford University Press, *Dictionary of Computing,* Fourth Edition, pp. 125, 299.

Mohan et al., "Aries–RRH: Restricted Repeating of History in the Aries Transaction Recovery Method," Data Engineering, 7th int'l. Conference, IEEE, pp. 718–727. Dec. 1991.

* cited by examiner

*Primary Examiner*—Dieu-Minh T. Le
(74) *Attorney, Agent, or Firm*—Hickman Palermo Truong & Becker, LLP; Edward A. Becker

(57) ABSTRACT

An approach for recovering after premature termination of a plurality of transactions involves: A) selecting a previously unselected transaction from the plurality of transactions; B) processing the selected transaction by undoing the lesser of a predetermined number of changes made by the selected transaction and all changes made by the selected transaction; and C) repeating steps A) and B) until all of the plurality of transactions have been processed. Another aspect of the approach involves: A) selecting a previously unselected transaction from the plurality of transactions, wherein the selected transaction is the previously unselected transaction from the plurality of transactions that made the fewest number of changes in the database; B) processing the selected transaction by undoing one or more changes in the database made by the selected transaction; and C) repeating steps A) and B) until all transactions from the plurality of transactions have been processed.

11 Claims, 6 Drawing Sheets

METHOD AND APPARATUS FOR IMPROVED TRANSACTION RECOVERY

This application is a continuation of application Ser. No. 08/618,443 filed Mar. 19, 1996, issued on Dec. 15, 1998 as U.S. Pat. No. 5,850,507.

FIELD OF THE INVENTION

The present invention relates to database management systems (DBMS). More specifically, the present invention relates to a method and apparatus for recovering after a crash of an instance in a database that allows users to access the database without having to wait for the DBMS to roll back every uncommitted transaction present during system failure.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is atomic and comprised of one or more database language statements is referred to as a transaction. In a database server, a memory area called the System Global Area (SGA) is allocated and one or more processes are started to execute one or more transactions. The combination of SGA background system processes and the processes executing transactions is called a database instance.

A buffer cache resides in a portion of the SGA and holds database information. Buffers in the buffer cache hold copies of data blocks that have been read from data files. The buffers are shared by all user processes concurrently connected to the instance. When a transaction desires to make a change to a data block, a copy of the data block is loaded into a buffer and the change is made to the copy of the data block stored in the database buffer cache in dynamic memory. Afterwards, a database writer writes the modified blocks of data from the database buffer cache to the data files on disk.

The SGA also contains a redo log buffer. A redo log buffer is a circular buffer that holds information about update operations recently performed by transactions. This information is stored in redo entries. Redo entries contain the information necessary to reconstruct, or redo, changes made by operations such as INSERT, UPDATE, DELETE, CREATE, ALTER, or DROP operations for example. Redo entries are generated for each change made to a copy of a data block stored in the database buffer cache. The redo log buffer is written to an active online redo log file group on disk by a background process. The records in the online redo log file group on disk are referred to as redo logs.

An instance failure can occur when a problem arises that prevents an instance from continuing work. Instance failures may result from hardware problems such as a power outage, or software problems such as an operating system or database system crash. Instance failures can also occur expectedly, for example, when a SHUTDOWN ABORT or a STARTUP FORCE statement is issued.

Due to the way in which database updates are performed to data files in some database systems, at any given point in time, a data file may contain some data blocks that (1) have been tentatively modified by uncommitted transactions and/ or (2) do not yet reflect updates performed by committed transactions. Thus, an instance recovery operation must be performed after an instance failure to restore a database to the transaction consistent state it possessed just prior to the instance failure. In a transaction consistent state, a database reflects all the changes made by transactions which are committed and none of the changes made by transactions which are not committed.

A typical DBMS performs several steps during an instance recovery. First, the DBMS rolls forward, or reapplies to the data files all of the changes recorded in the redo log. Rolling forward proceeds through as many redo log files as necessary to bring the database forward in time to reflect all of the changes made prior to the time of the crash. Rolling forward usually includes applying the changes in online redo log files, and may also include applying changes recorded in archived redo log files (online redo files which are archived before being reused). After rolling forward, the data blocks contain all committed changes as well as any uncommitted changes that were recorded in the redo log prior to the crash. Rollback segments include records for undoing uncommitted changes made during the roll-forward operation. In database recovery, the information contained in the rollback segments is used to undo the changes made by transactions that were uncommitted at the time of the crash. The process of undoing changes made by the uncommitted transactions is referred to as "rolling back" the transactions.

FIG. 1 illustrates rolling forward and rolling back. Database 110 is a database requiring recovery at time $t_1$. Database 120 represents the database after a redo log is applied at time $t_2$. The database 120 comprises both changes made by committed transactions 121 and changes made by uncommitted transactions 122. Database 130 represents the database at time $t_3$ after a rollback segment is applied. The database 130 comprises only changes made by committed transactions 121.

When rolling back a transaction, the DBMS releases any resources (locks) held by the transaction at the time of failure. Lastly, the DBMS resolves any pending distributed transactions that were undergoing a two-phase commit coordinated by the DBMS at the time of the instance failure.

One disadvantage of the prior method of recovering after a crash of an instance of a database is that it required changes made by uncommitted transactions to be rolled back before the database could be made available to new transactions. This would take a long period of time when a large number of transactions were active during the instance, because it would require a large number of transactions to be rolled back, including changes to the parts of the database which are not of immediate interest to the users.

SUMMARY OF THE INVENTION

According to one aspect of the invention, a method for recovering after premature termination of a plurality of transactions comprises the steps of: A) selecting a previously unselected transaction from the plurality of transactions; B) processing the selected transaction by undoing the lesser of a predetermined number of changes made by the selected transaction and all changes made by the selected transaction; and C) repeating steps A) and B) until all of the plurality of transactions have been processed.

According to another aspect of the invention, a method for recovering a database after the premature termination of a plurality of transactions comprises the computer implemented steps of: A) selecting a previously unselected transaction from the plurality of transactions, wherein the selected transaction is the previously unselected transaction from the plurality of transactions that made the fewest number of changes in the database; B) processing the selected transaction by undoing one or more changes in the database made by the selected transaction; and C) repeating steps A) and B) until all transactions from the plurality of transactions have been processed.

According to another aspect of the invention, a computer system for recovering after premature termination of a plurality of transactions comprises one or more processors and a memory coupled to the one or more processors. The memory contains one or more sequences of one or more instructions which, when executed by the one or more processors, cause the one or more processors to perform the steps of: A) selecting a previously unselected transaction from the plurality of transactions; B) processing the selected transaction by undoing the lesser of a predetermined number of changes made by the selected transaction and all changes made by the selected transaction; and C) repeating steps A) and B) until all of the plurality of transactions have been processed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for recovering after a crash of an instance in a database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
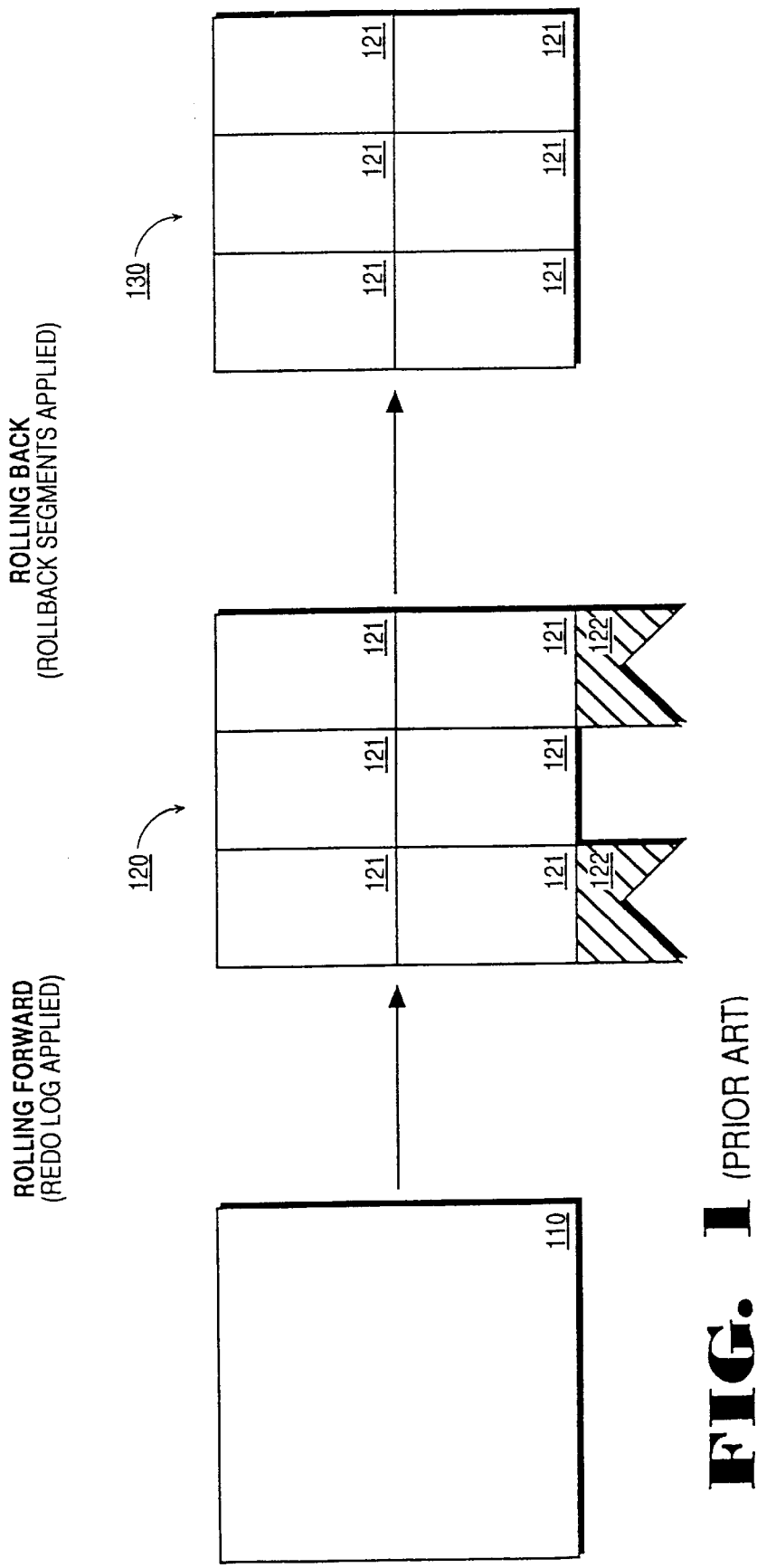
FIG. 1 illustrates rolling forward and rollback operations.
Figure 2:
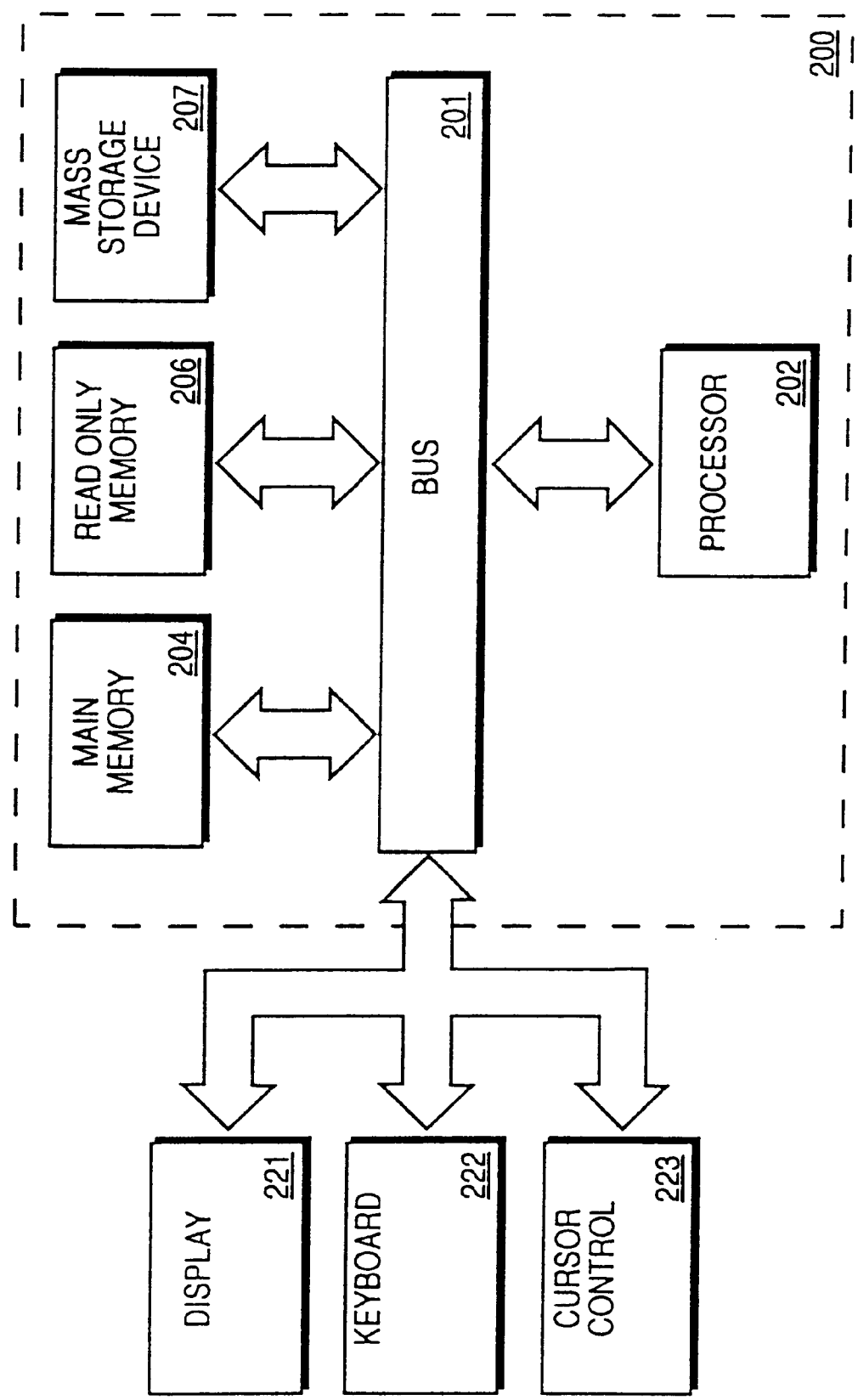
FIG. 2 is a block diagram of a system which may be programmed to implement the present invention.

Referring to FIG. 2, the computer system upon which the preferred embodiment of the present invention can be implemented is shown as 200. Computer system 200 comprises a bus or other communication means 201 for communicating information, and a processing means 202 coupled with bus 201 for processing information. System 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

In the currently preferred embodiment of the invention, computer system 100 is configured to execute a database application that recovers after a crash of an instance.

ROLLBACK SEGMENTS

Figure 3:
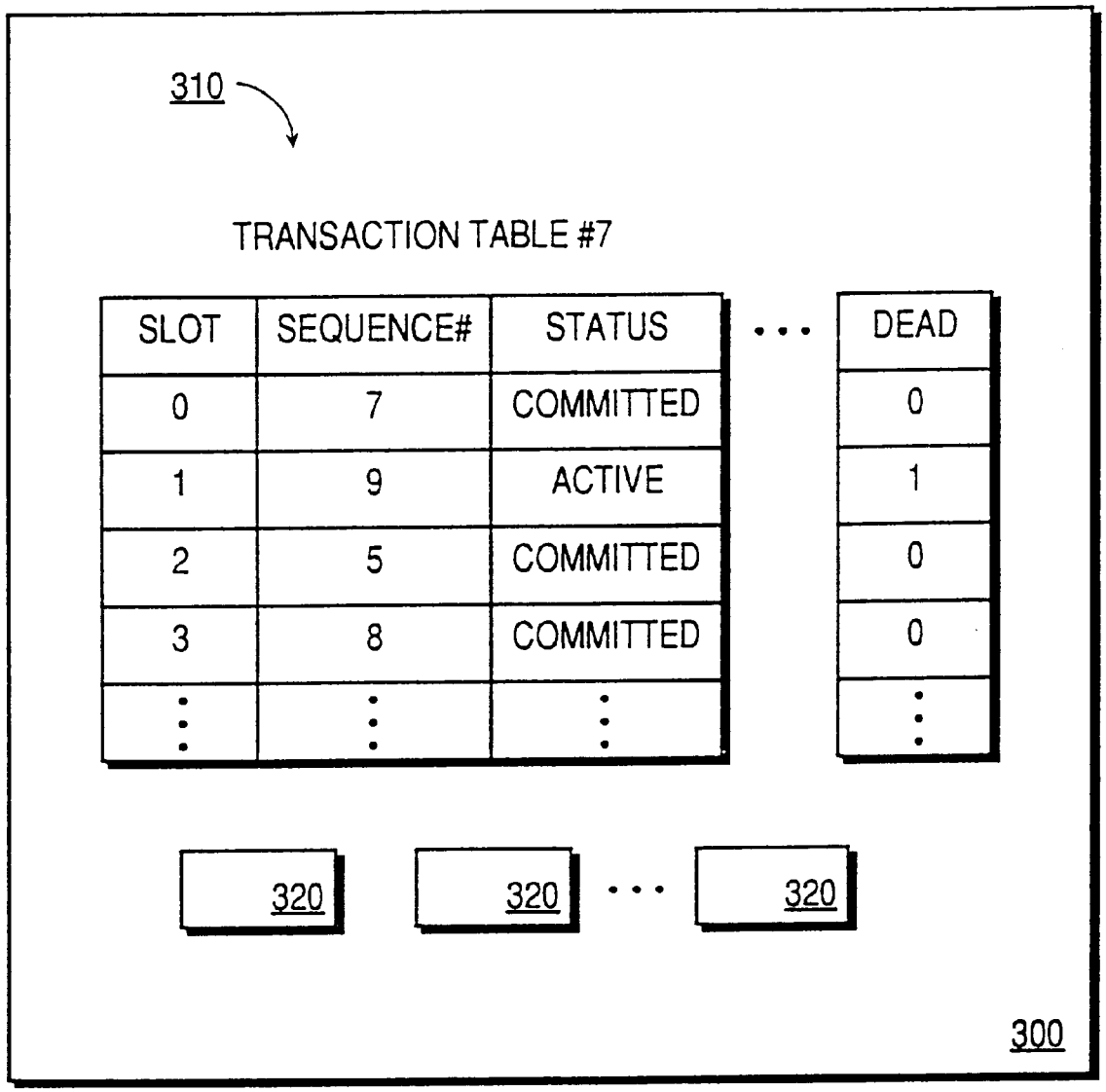
FIG. 3 illustrates a rollback segment header according to one embodiment of the present invention.

Each database contains one or more rollback segments. Each rollback segment contains a transaction table and a plurality of rollback entries (undo records). After being rolled forward, a rollback segment contains state information of transactions before a crash. FIG. 3 illustrates an exemplary rollback segment 300 with transaction table 310 and rollback entries 320. A transaction table includes a plurality of slots, where each slot can hold an entry that corresponds to a transaction. Each entry contains a sequence number, a status indication, and a field for indicating whether or not the corresponding transaction is dead.

The number of entries that a particular transaction table can hold is limited. When a transaction table is full and an entry needs to be added for a new transaction, the entry that corresponds to the oldest transaction is overwritten with the new entry. To distinguish between transactions that have used the same slot, the sequence number for a slot is changed every time the slot is reused. For example, every time a slot is reused, the sequence number may be incremented.

To uniquely identify transactions, transaction IDs are generated from the information contained in the transaction table entries that correspond to the transaction. In one embodiment, the transaction ID of a transaction consists of the number of the transaction table that contains the entry for the transaction, the slot number that holds the entry, and the sequence number of the transaction.

Rollback entries are kept for transaction tables. A rollback entry contains undo information that specifies how to remove changes made to the database during an operation in a particular transaction. Rollback entries for the same transaction are linked together so the entries can easily be found if necessary for transaction rollback.

DATA CONTAINERS

Figure 4:
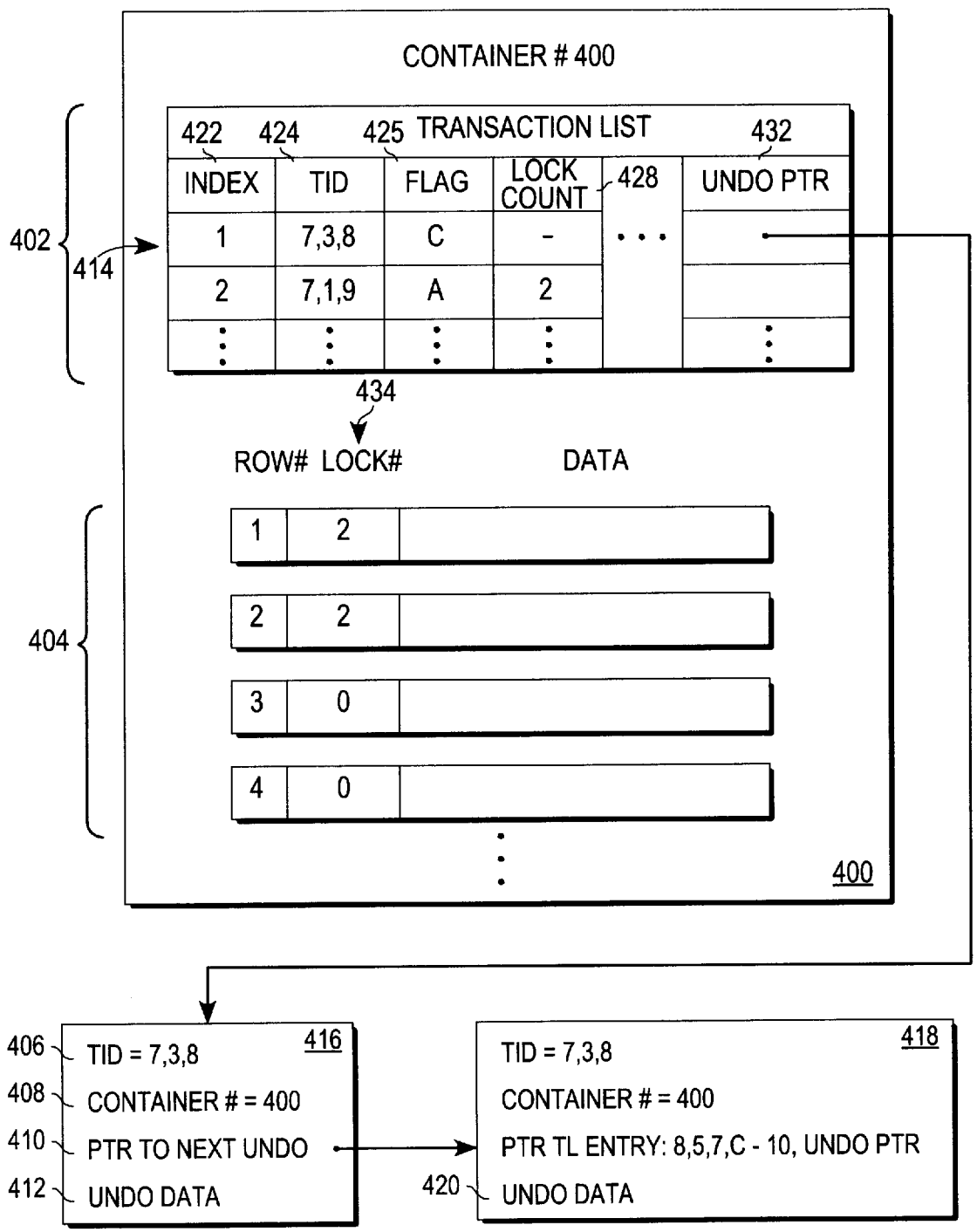
FIG. 4 illustrates a data container and rollback records of a database according to an embodiment of the invention.

When data in the database is changed in response to the execution of a transaction, the transaction ID of the transaction is stored with the data to identify the transaction that made the changes. Referring to FIG. 4, it illustrates an exemplary data container 400 of a database. The data container 400 includes a transaction list section 402 and a data section 404. The transaction list section 402 includes entries that correspond to transactions that have modified data container 400. Each entry includes an index number 422, a transaction ID 424, a status flag 425, a lock count indicator 428, and an undo pointer 432.

The status flag 425 indicates whether the transaction that corresponds to the entry is active or has committed. The lock count indicator 428 indicates how many rows within the block are write locked by the transaction. The undo pointer 432 points to a rollback entry in the rollback segment that indicates how to undo the most recent change made to the block by the transaction that corresponds to the entry.

The data section of the block includes rows of data. A portion of each row is used as a write lock indicator 434 to indicate whether the row is currently write locked. In the preferred embodiment, the write lock indicator 434 contains a number that indicates the entry in the transaction list belonging to the transaction that holds the lock on the row in question.

ROLLBACK ENTRIES

FIG. 4 also illustrates the contents of a rollback entry in a rollback segment and how the rollback entry is accessed by an undo pointer according to an embodiment of the invention. The rollback entry includes a transaction ID 406, a block number 408, a prior change pointer 410, and undo information 412. The transaction ID 406 identifies the transaction which performed the operation that corresponds to the undo record. The block number 408 indicates the data container on which the operation was performed. The undo information 412 contains data necessary for undoing the operation that was performed on the identified block by the identified transaction.

The undo pointer 410 points to a rollback entry 418 for undoing a previous change to the same block by the same transaction. Each change made to the block by a transaction is linked in this manner to form a linked list of rollback entries. The undo pointer in the transaction list section 402 points to the end of the linked list that represents the most recent change to the block made by the transaction. At the other end of the linked list is the undo record that corresponds to the first change made to the block by the transaction.

The rollback entry that corresponds to the first change made to the block by a particular transaction does not contain a pointer to an undo record for an earlier change to the block by the same transaction, since there can be no change earlier than the first change. Rather, the rollback entry that corresponds to the first change made by a transaction to a block contains the entry that was overwritten in the transaction list of the block by the entry for the transaction at issue.

In the illustrated example, the entry 414 corresponds to the transaction identified by the transaction ID "7,3,8". The undo pointer in entry 414 points to the rollback entry 416 that corresponds to the last change made to data container 400 by transaction "7,3,8". The undo pointer of rollback entry 416 points to rollback entry 418 that corresponds to the first change made to data container 400 by transaction "7,3,8". Thus, transaction "738" made two updates to the data in data container 400. The undo record 418 contains a record 420 of the entry that was overwritten by entry 414.

RECOVERY AFTER AN INSTANCE FAILURE

Figure 5:
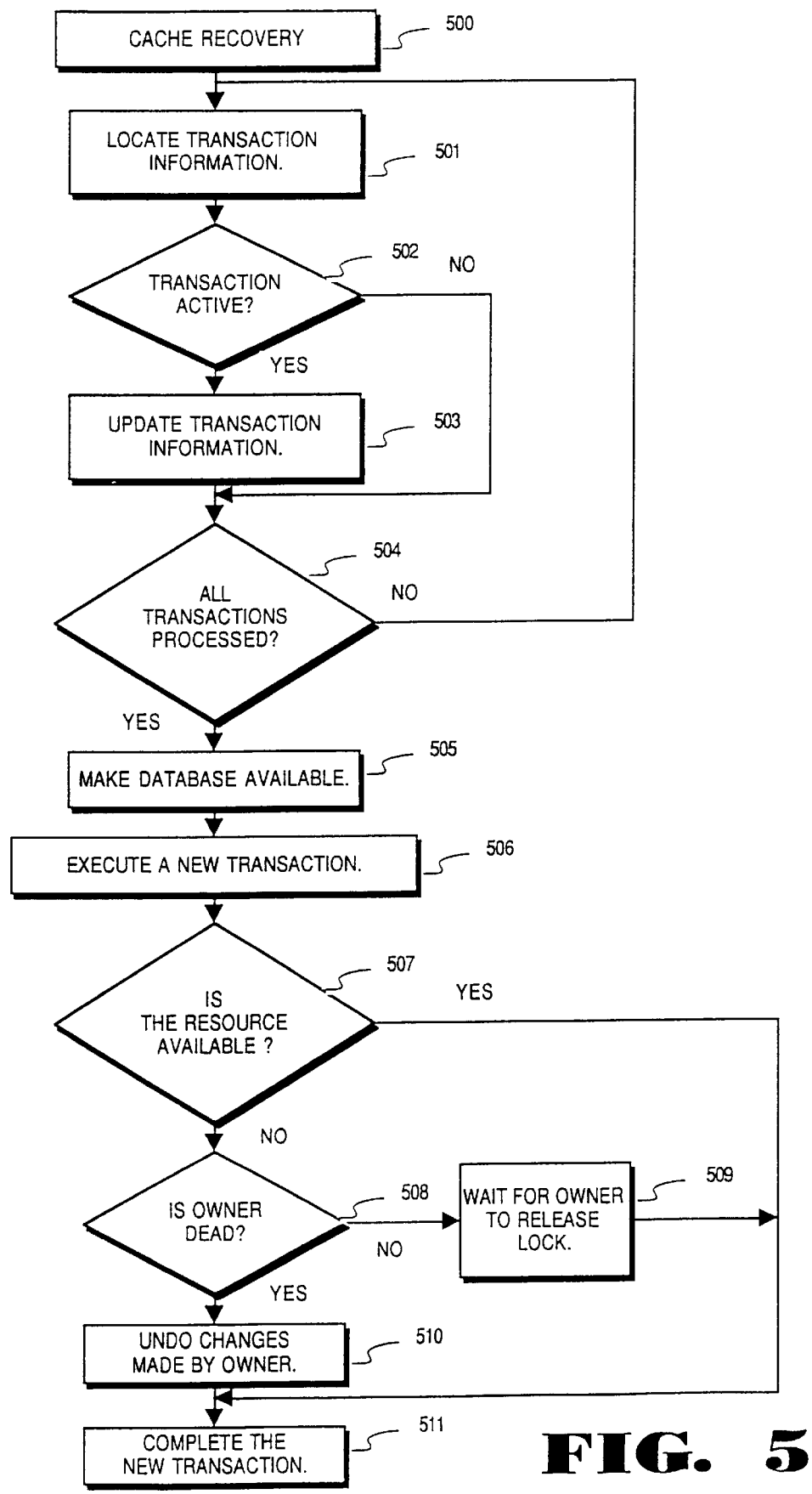
FIG. 5 is a flow chart illustrating a method for recovering after an instance failure in a database.

FIG. 5 is a flowchart illustrating a method for recovering after an instance failure in a database. At step 500, cache recovery is performed. Cache recovery involves updating the database to reflect changes that had been made to cached blocks of data prior to the crash, but which had not yet been applied to the database at the time of the crash. As mentioned earlier, cache recovery typically involves applying a plurality of changes recorded in a redo log to data files in the database.

At step 501, transaction information that corresponds to a transaction associated with an instance that crashed is found. In one embodiment of the present invention, the transaction information is in the form of a transaction table such as the table illustrated in FIG. 3. The transaction table includes entries corresponding to transactions that existed in an instance. Finding transaction information corresponding to a transaction associated with an instance that crashed can be achieved by identifying a rollback segment associated with the instance that crashed. Once a rollback segment associated with the instance that crashed is identified, a transaction table in the rollback segment may be accessed.

At step 502, it is determined based on the transaction information whether the transaction associated with the instance that crashed was active. This determination can be achieved by reading status information in the transaction table. The status information will indicate whether the transaction was committed or active at the time of the instance failure. If the transaction was active when the instance crashed, then control proceeds to step 503. If the transaction was committed when the instance crashed, then control proceeds to step 504.

At step 503, the transaction information is updated to indicate that the transaction is dead. This can be achieved by setting a flag in a field of an entry that is associated with the transaction in the transaction table. For example, a bit may be set in the "DEAD" field of the transaction table entry that corresponds to the transaction (see FIG. 3).

At step 504, it is determined whether all the transactions are processed. If all the transactions are processed, control proceeds to step 505. If not all the transactions are processed, control returns to step 501.

At step 505, the database is made available to the users. By making the database available to the users after updating the transaction information and before undoing any updates performed by the dead transaction, the present method for recovery allows the user to access data that was not affected by the instance crash almost immediately after the crash. Thus, the users are not penalized by having to wait for the DBMS to recover data files which the users would otherwise not need to access.

At step 506, a new transaction is executed. When the new transaction requests access to a resource, it is determined whether the resource is available or unavailable (step 507). The resource will not be available if resources is locked by another transaction. Determining whether a resource is available or unavailable can be achieved by checking the write lock indicator in the data section of a container. If the resource is unavailable, control proceeds to step 508. If the resource is available, control proceeds to step 511.

At step 508, it is determined whether the locked resource belongs to a dead transaction (i.e. a transaction that was active and uncommitted at the time of the crash). Determining whether a resource belongs to a dead transaction can be achieved by first checking the transaction list of the container that corresponds to the resource, such as container 400 illustrated in FIG. 4, to determine the identity of the owner of the resource. Once the owner of the resource is identified, transaction information corresponding to the owner (e.g. the transaction table entry for the owner) is found to determine whether the owner is a transaction which is dead. If the resource belongs to an owner that is not dead, control proceeds to step 509. If the resource belongs to an owner that it is dead, control proceeds to step 510.

At step 509, control proceeds to wait for the resource to be made available. When the current owner of the resource completes, the lock on the resource will be released.

At step 510, the new transaction makes the resource available (unlocks the resource) by undoing some or all of the changes made by the dead transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released.

At step 511, the new transaction accesses the resource and completes the transaction.

According to one embodiment of the present invention, the new transaction undoes other changes made by the other dead transactions after undoing the change made by the dead transaction which locked the resource. The new transaction accesses other rollback entries which are linked to the rollback entry associated with the portion of the change which locked the resource and executes operations in these roll back entries. According to an alternate embodiment of the present invention, the new transaction ceases rolling back the dead transaction after a predetermined amount of undo records from the rollback entries have been executed. The policy of limiting the amount of rollback a new transaction must perform places a cap on the performance penalty that new transactions will suffer when blocked by a dead transaction. According to still an alternate embodiment of the present invention, the new transaction undoes all the changes made by the dead transaction which locked the resource only.

In another embodiment of the present invention, the new transaction undoes all changes made by the transaction which was active when the instance crashed.

An independent background process dedicated to rolling back changes made by dead transactions can be used instead of or in combination with causing new transactions to roll back the dead transactions that block them. In one embodiment, an independent recovery process makes multiple passes over all the transactions that need recovery and applies only a predefined number of undo records per dead transaction per pass. Thus, instead of sequentially rolling back entire transactions which are marked dead, the independent recovery process applies a predefined number of undo records of a dead transaction and then proceeds to rollback the next dead transaction. This prevents the rollback of long transactions that are dead from imposing long delays on the rollback of shorter transactions that are dead. In another embodiment of the present invention, the independent recovery process recovers short running transactions before longer running transaction. This prevents the longer transactions from holding up the recovery process.

RECOVERY AFTER A TRANSACTION FAILURE

Figure 6:
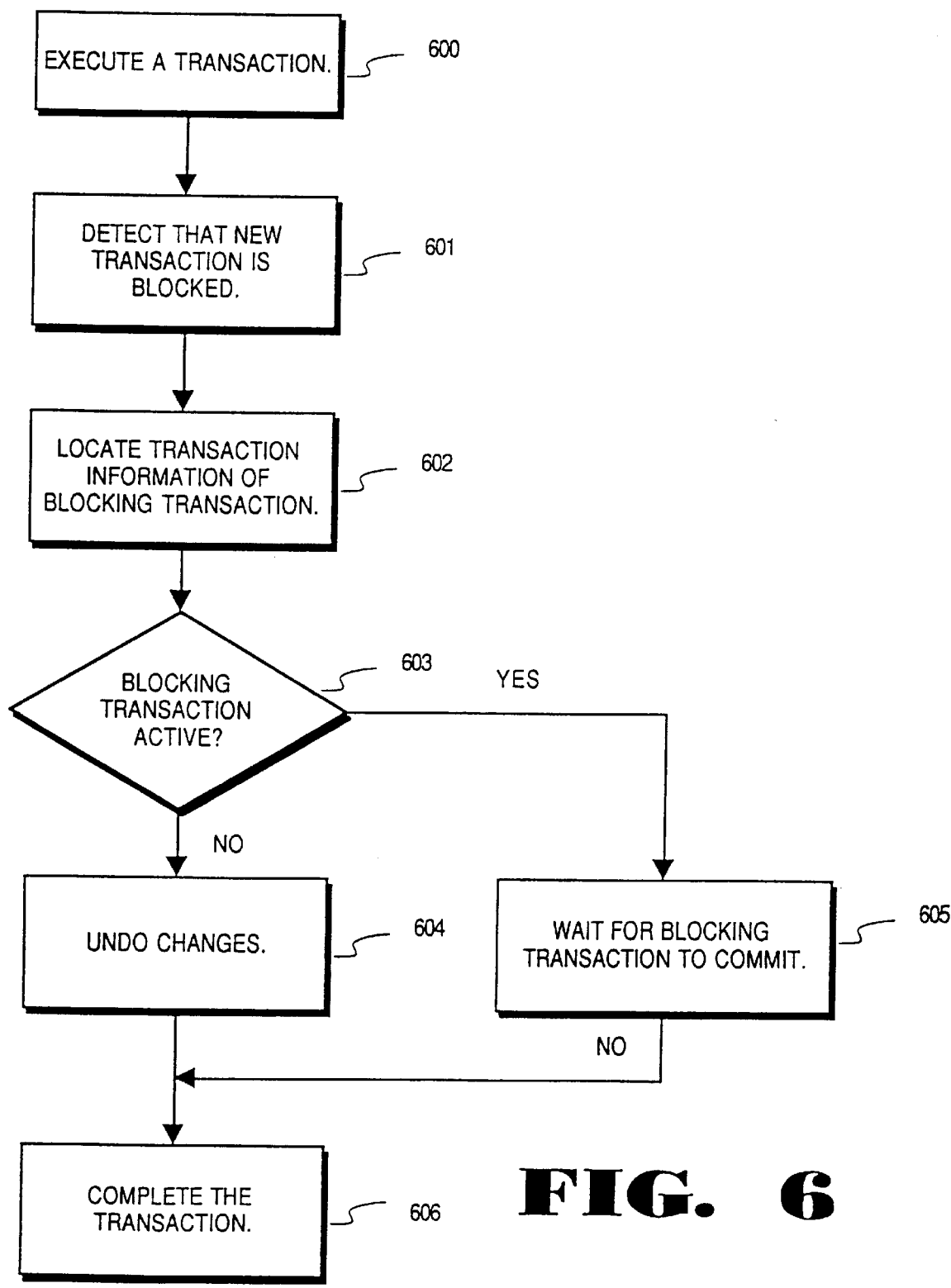
FIG. 6 is a flow chart illustrating a method for recovering after a transaction failure in a database.

FIG. 6 is a flowchart illustrating a method for recovering after a transaction prematurely terminates. These steps may be performed when a new transaction attempts to access resource that is held by another transaction. At step 600, a new transaction is executed.

At step 601, the system detects that a new transaction is blocked. The detection is achieved when the new transaction attempts to access a resource held by another transaction.

At step 602, transaction information that corresponds to the blocking transaction is found. In one embodiment of the present invention, the transaction information is in the form of an entry in a transaction table such as the table 310 illustrated in FIG. 3. As explained above, the transaction table 310 includes entries, each of which corresponds to and reflects the current state of the transaction corresponding to transactions that existed in an instance.

At step 603, it is determined, based on the transaction information, whether the blocking transaction is an active transaction or a dead transaction. This determination can be achieved by reading status information in the transaction table and gaining access to a memory structure indicating that the transaction is still alive. The status information will indicate whether the transaction is active or committed. According to one embodiment, a dead status is indicated by an active status flag in a transaction table of an instance that crashed. If the transaction is dead, then control proceeds to step 604. If the transaction is active, then control proceeds to step 605.

At step 604, the new transaction undoes some or all of the changes made by the blocking transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released.

At step 605, the system waits for the blocking transaction to commit.

At step 606, the new transaction accesses the resource and completes the transaction.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing recovery after premature termination of a plurality of transactions, the method comprising the steps of :

establishing a specified maximum number of changes to be undone for each of the plurality of transactions during a phase of the recovery, wherein the following steps are performed during the phase of the recovery:

A) selecting a previously unselected transaction from the plurality of transactions;

B) processing the selected transaction by undoing the lesser of the specified maximum number of changes made by the selected transaction and all changes made by the selected transaction; and C) repeating steps A) and B) until all of the plurality of transactions have been processed.

2. The method as recited in claim 1, wherein the step of undoing the lesser of the specified maximum number of changes made by the selected transaction and all changes made by the selected transaction includes the step of applying the lesser of the specified maximum number of undo records associated with the selected transaction and all undo records associated with the selected transaction.

3. The method as recited in claim 1, further including the steps of

D) re-establishing all transactions in the plurality of transactions as unselected transactions, E) repeating steps A), B) and C), and F) repeating steps D) and E) until all of the changes made by the plurality of transactions have been undone.

4. A method for performing recovery of a database after the premature termination of a plurality of transactions, the method comprising the computer implemented steps of:

establishing a specified maximum number of changes to be undone for each of the plurality of transactions during a phase of the recovery, wherein the following steps are performed during the phase of the recovery:

A) selecting a previously unselected transaction from the plurality of transactions, wherein the selected transaction is the previously unselected transaction from the plurality of transactions that made the fewest number of changes in the database;

B) processing the selected transaction by undoing the lesser of the specified maximum number of changes made in the database by the selected transaction and all of the changes in the database made by the selected transaction; and C) repeating steps A) and B) until all transactions from the plurality of transactions have been processed.

5. The method as recited in claim 4, further comprising the step of executing an independent recovery process to undo the lesser of the specified maximum number of changes in the database made by the selected transaction and all of the changes in the database made by the selected transaction.

6. A computer system for performing recovery after premature termination of a plurality of transactions, the computer system comprising:

one or more processors; and a memory coupled to the one or more processors and containing one or more sequences of one or more instructions which, when executed by the one or more processors, cause the one or more processors to perform the steps of:

establishing a specified maximum number of changes to be undone for each of the plurality of transactions during a phase of the recovery, wherein the following steps are performed during the phase of the recovery:

A) selecting a previously unselected transaction from the plurality of transactions;

B) processing the selected transaction by undoing the lesser of the specified maximum number of changes made by the selected transaction and all changes made by the selected transaction; and C) repeating steps A) and B) until all of the plurality of transactions have been processed.

7. The computer system as recited in claim 6, wherein the step of undoing the lesser of the specified maximum number of changes made by the selected transaction and all changes made by the selected transaction includes the step of applying the lesser of the specified maximum number of undo records associated with the selected transaction and all undo records associated with the selected transaction.

8. The computer system as recited in claim 6, wherein memory further includes instructions for D) re-establishing all transactions in the plurality of transactions as unselected transactions, E) repeating steps A), B) and C), and F) repeating steps D) and E) until all of the changes made by the plurality of transactions have been undone.

9. A computer-readable medium for performing recovery after premature termination of a plurality of transactions, the computer-readable medium carrying:

one or more instructions which, when executed by one or more processors, cause the one or more processors to establish a specified maximum number of changes to be undone for each of the plurality of transactions during a phase of the recovery, wherein the following steps are performed during the phase of the recovery:

A) one or more instructions which, when executed by one or more processors, cause the one or more processors to select a previously unselected transaction from the plurality of transactions;

B) one or more instructions which, when executed by the one or more processors, cause the one or more processors to process the selected transaction by undoing the lesser of the specified maximum number of changes made by the selected transaction and all changes made by the selected transaction; and C) one or more instructions which, when executed by the one or more processors, cause the one or more processors to repeat steps A) and B) until all of the plurality of transactions have been processed.

10. The computer-readable medium as recited in claim 9, wherein the step of undoing the lesser of the specified maximum number of changes made by the selected transaction and all changes made by the selected transaction includes the step of applying the lesser of the specified maximum number of undo records associated with the selected transaction and all undo records associated with the selected transaction.

11. The computer-readable medium as recited in claim 9, further carrying

D) one or more instructions which when executed by the one or more processors, cause the one or more processors to re-establish all transactions in the plurality of transactions as unselected transactions, E) one or more instructions which, when executed by the one or more processors, cause the one or more processors to repeat steps A), B) and C), and F) one or more instructions which, when executed by the one or more processors, cause the one or more processors to repeat steps D) and E) until all of the changes made by the plurality of transactions have been undone.

* * * * *